Aug. 7, 1923.  
E. C. MITCHELL  
1,464,211  
COMIC ARTIFICIAL EYE  
Filed June 14, 1922

Inventor  
Elmer C. Mitchell,  
by Rippey Kingsland,  
His Attorneys.

Patented Aug. 7, 1923.

1,464,211

UNITED STATES PATENT OFFICE.

ELMER C. MITCHELL, OF ST. LOUIS, MISSOURI.

COMIC ARTIFICIAL EYE.

Application filed June 14, 1922. Serial No. 568,141.

*To all whom it may concern:*

Be it known that I, ELMER C. MITCHELL, a citizen of the United States, residing at St. Louis, Missouri, have invented a new and useful Comic Artificial Eye, of which the following is a specification.

The invention relates to comic artificial eyes.

An object of the invention is to provide a device adapted to be worn as a comic artificial eye for amusement purposes.

Figure 1:
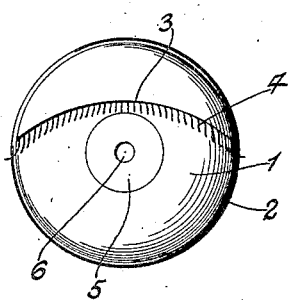
Figure 2:
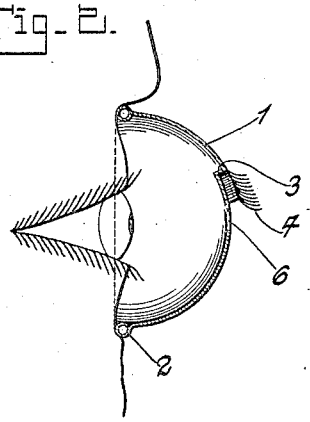

In the drawing Fig. 1 is a front elevation, and Fig. 2 is sectional view of my improved artificial eye.

In the form of the invention shown the device comprises about half of a sphere. The hemispherical body may be made of any appropriate material shaped to provide a relatively thin hemispherical wall 1 having its edge shaped to provide a roll 2 adapted to be engaged in the eye socket in the manner of a monocle, with the convex portion extending forwardly.

Across the front portion of the body a ridge 3 is formed to have the appearance of the upper eye lid, and a row of bristles 4 are connected with the ridge 3 to simulate the upper eye lashes.

Below the ridge 3 a circular portion 3 is colored to simulate the iris of the eye and the remaining portion of the front of the device, below the eye lashes and around the iris, is white. Through the center of the iris 5 a slight opening 6 is formed, through which the wearer of the device may see.

The device is intended for amusement purposes, and it will be seen that the object of its provision is obtained.

I do not restrict myself unessentially, but what I claim and desire to secure by Letters Patent is:—

A comic artificial eye, comprising a forwardly convexed body adapted to cover the eye of the wearer and having a marginal portion adapted to engage against the front of the eye lids in the eye socket of the wearer and having a sight opening through the front thereof, an arched ridge forwardly beyond the subjacent portion of the body above the sight opening and representing the upper eye lid, a row of eye lashes extending from said ridge representing the upper lashes of a person, and a colored portion on the front of the body below said ridge and eye lashes and around said opening representing the iris of an eye.

ELMER C. MITCHELL.